US006962445B2

(12) United States Patent
Zimmel et al.

(10) Patent No.: US 6,962,445 B2
(45) Date of Patent: Nov. 8, 2005

(54) RUGGEDIZED FIBER OPTIC CONNECTION

(75) Inventors: Steven C. Zimmel, Minneapolis, MN (US); Trevor D. Smith, Eden Prairie, MN (US); Michael J. Shorter, Lonsdale, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 18 days.

(21) Appl. No.: 10/658,739

(22) Filed: Sep. 8, 2003

(65) Prior Publication Data

US 2005/0041928 A1 Feb. 24, 2005

(51) Int. Cl.[7] .................................. G02B 6/38
(52) U.S. Cl. ........................ 385/55; 439/587
(58) Field of Search .................. 385/60, 70, 71, 385/72, 78, 88, 89, 92, 94; 439/271, 274, 587, 589

(56) References Cited

U.S. PATENT DOCUMENTS

| 6,179,475 | B1 | * | 1/2001 | Takamatsu et al. | 385/53 |
| 6,186,670 | B1 | * | 2/2001 | Austin et al. | 385/55 |
| 6,234,683 | B1 | | 5/2001 | Waldron et al. | |
| 6,254,278 | B1 | * | 7/2001 | Andrews et al. | 385/53 |
| 6,298,190 | B2 | | 10/2001 | Waldron et al. | |
| 6,568,861 | B2 | * | 5/2003 | Benner et al. | 385/55 |
| 6,579,014 | B2 | * | 6/2003 | Melton et al. | 385/76 |
| 6,648,520 | B2 | * | 11/2003 | McDonald et al. | 385/78 |
| 6,739,759 | B1 | * | 5/2004 | Seeley | 385/60 |
| 2002/0022392 | A1 | | 2/2002 | Below et al. | |

FOREIGN PATENT DOCUMENTS

| EP | 0 581 527 A1 | 2/1994 |
| EP | 1 333 537 A1 | 8/2003 |
| EP | 1 457 793 A2 | 9/2004 |
| GB | 2 154 333 A | 9/1985 |

OTHER PUBLICATIONS

Stratos Lightwave™ Brochure, "HQLC Hermaphroditic Butt Joint Connector," 2 pages (Undated).

Stratos Lightwave™ Brochure, "HDLC Hermaphroditic Butt Joint Connector," 2 pages (Undated).

Delphi Connection Systems, "Harsh Environment Hermaphroditic Fiber Optic Connectors," 16 pages (© 2002).

* cited by examiner

Primary Examiner—Thanh-Tam Le
(74) Attorney, Agent, or Firm—Merchant & Gould PC

(57) ABSTRACT

A fiber optic cable connection system comprising a first fiber optic connector including a ferrule within which an optical fiber is mounted and a fiber optic adapter for receiving the first fiber optic connector including a sleeve for receiving the ferrule. The first fiber optic connector is mounted within a first threaded body with the fiber optic cable extending through an opening in a distal end of the first threaded body and the ferrule accessible through a proximal end of the first threaded body. The fiber optic adapter is mounted within a second threaded body and the second threaded body adapted for mounting to a bulkhead. The second threaded body adapted to engage the proximal end of the first threaded body with the first connector engaging the adapter and the ferrule extending into the sleeve. An outer housing is threadably mounted about both the first and second threaded bodies when the second threaded body is engaging the proximal end of the first threaded body. The first and second threaded bodies and the outer housing cooperate to hold the first connector engaging the adapter.

8 Claims, 9 Drawing Sheets

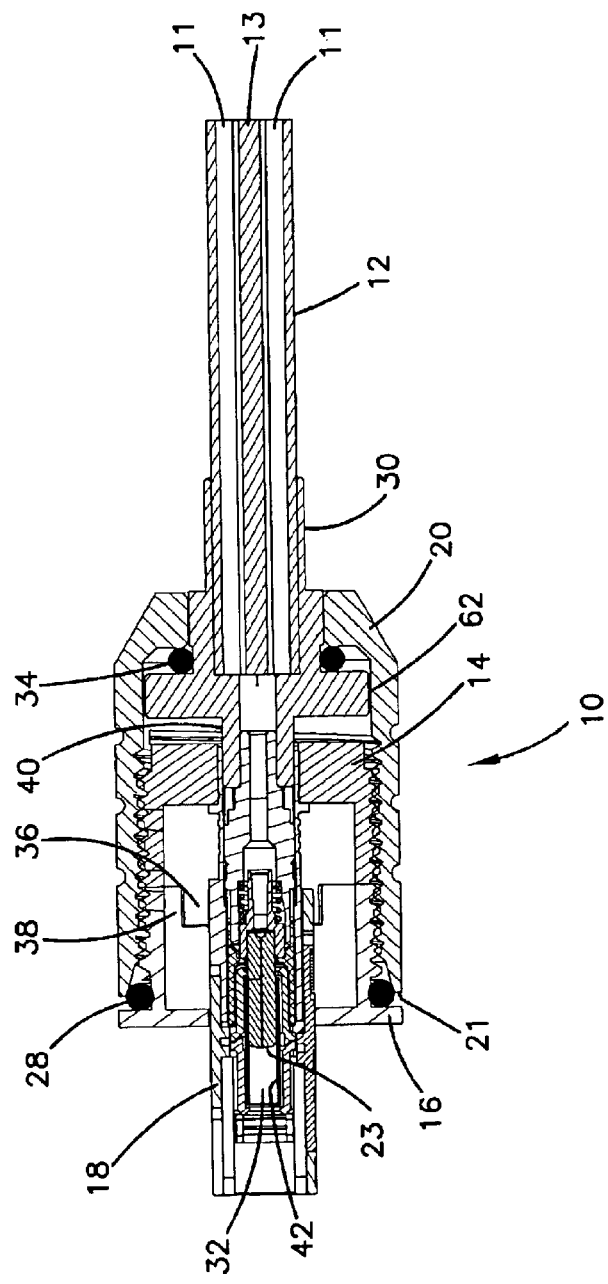
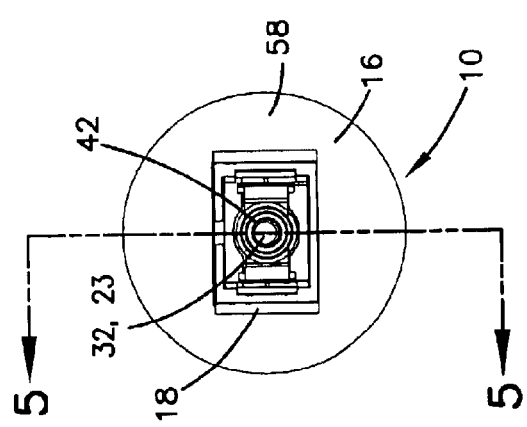
FIG.5
FIG.4

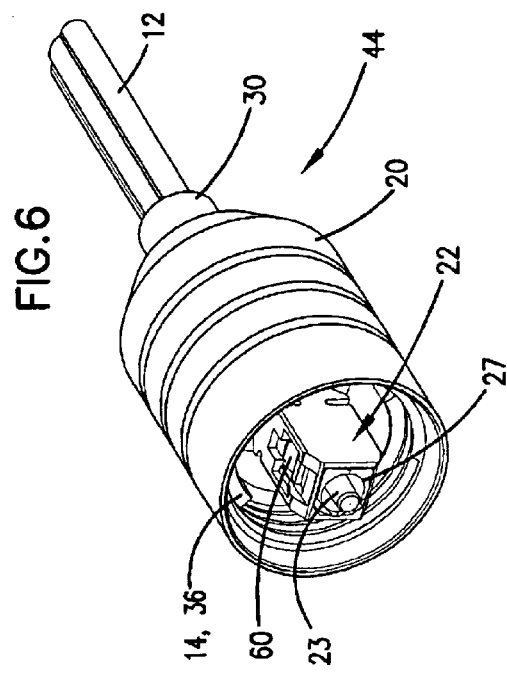
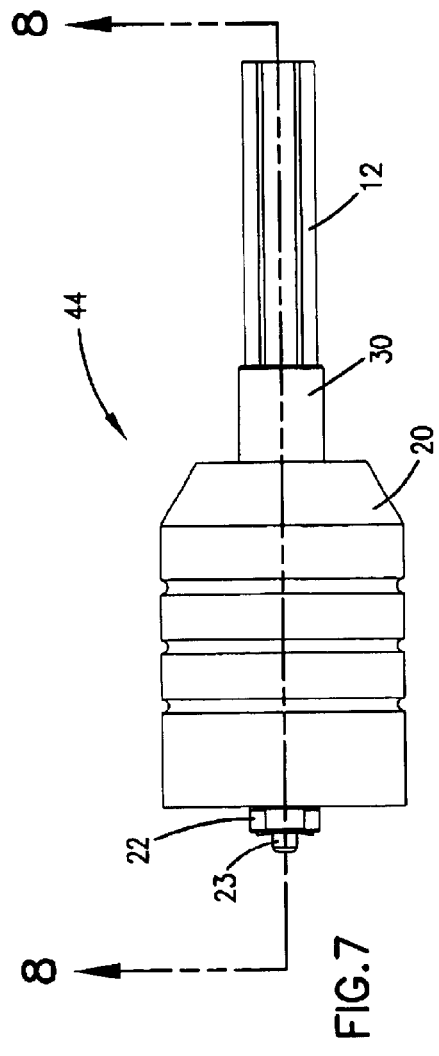
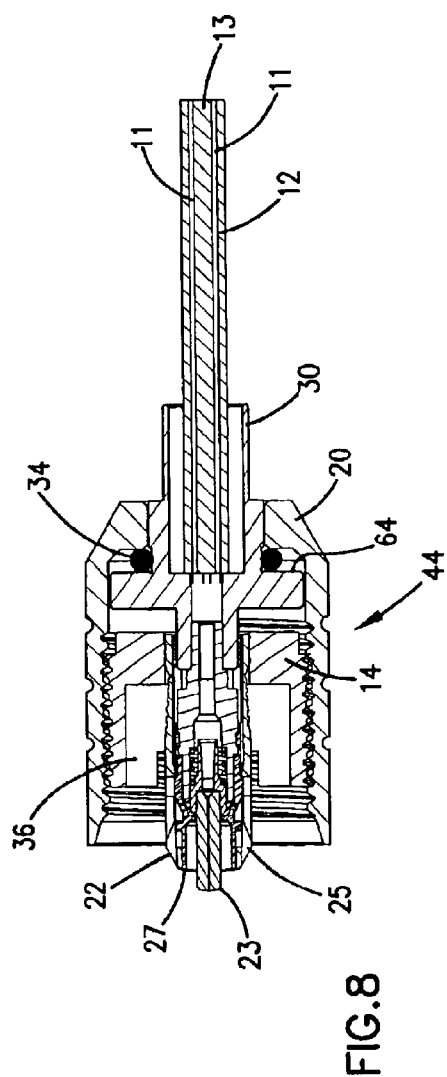
FIG.6
FIG.7
FIG.8

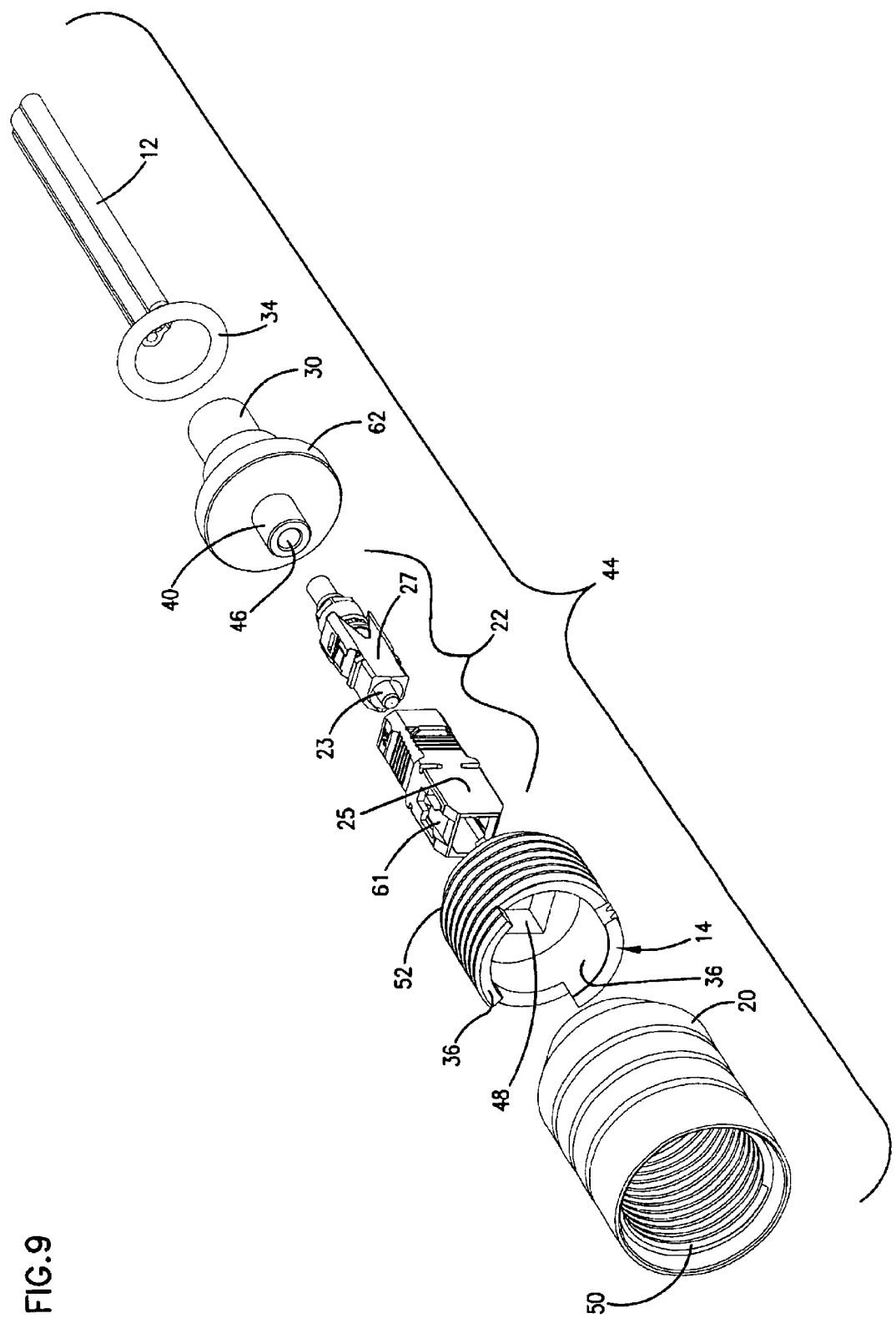

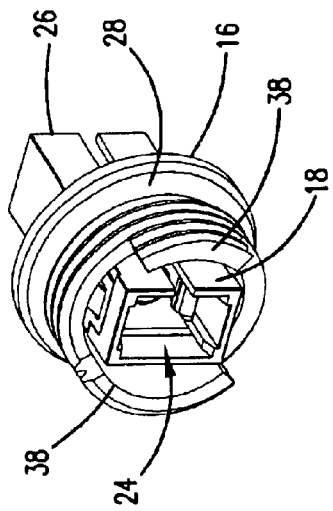
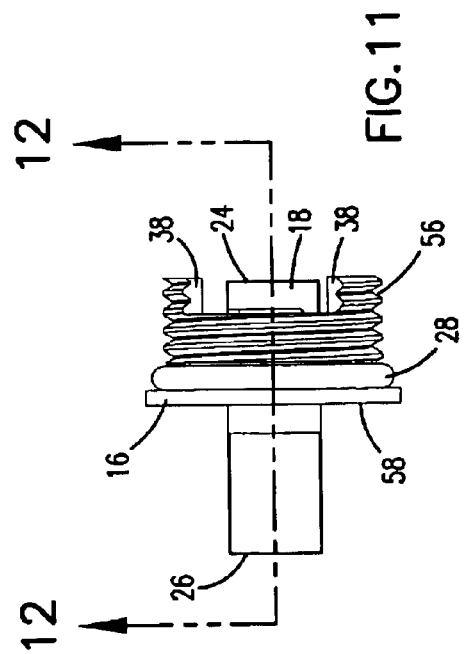
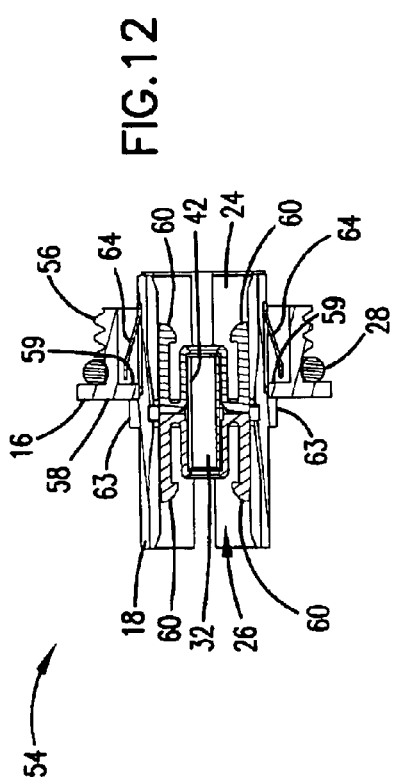

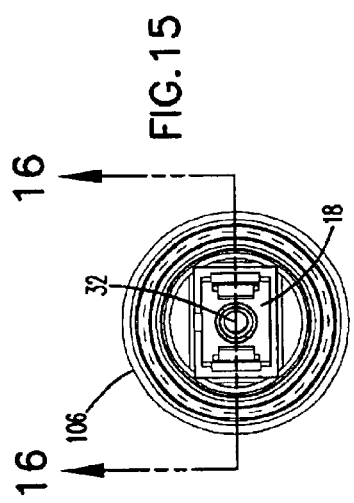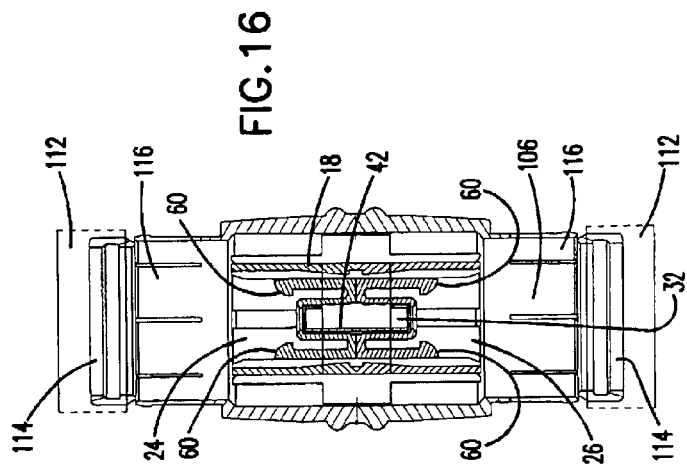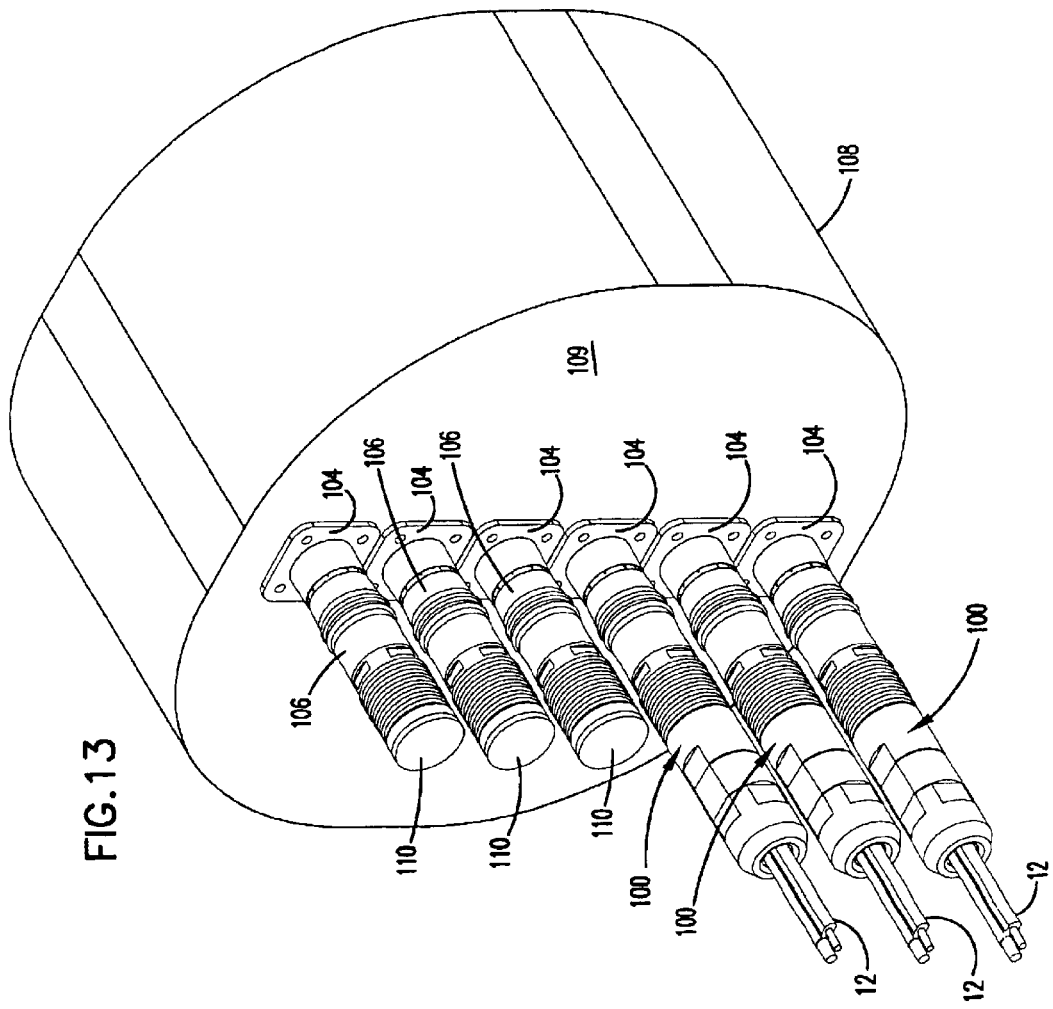

RUGGEDIZED FIBER OPTIC CONNECTION

FIELD OF THE INVENTION

The present invention relates generally to fiber optic connectors and adapters. More specifically, the present invention relates to a ruggedized housing for securely connecting and environmentally sealing fiber optic connectors and adapters.

BACKGROUND

In telecommunications networks, optical fiber service connections to customers are becoming more popular. As the use of optical fiber is extended to more customers directly, the need for improved optical fiber connectors that are able to withstand adverse environmental conditions has increased. Known optical fiber connector and adapter combinations are suitable for connecting optical fiber cables but are not well suited to withstanding adverse weather conditions. Ruggedized fiber optic connection systems are desirable.

In existing telecommunications installations, it is known to have overhead cables providing service to customers. Other service connections or drops also potentially place the service drop cable under some amount of tension or strain. For such service connections, it is known to use an armored cable or a drop cable with added strength members. In conjunction with such service drops, it is desirable to provide drop cable connections which are capable of withstanding the tension or strain exerted by the cable. It is also desirable that these drop cable connections be made with standardized connector and adapter combinations for consistency with other optical fiber connectors and adapters in use in the telecommunications network.

It is also desirable that these drop cable connections be made in the field without the need for field termination of the cables.

SUMMARY

The present invention relates to a fiber optic cable connection system comprising a first fiber optic connector including a ferrule within which an optical fiber is mounted and a fiber optic adapter for receiving the first fiber optic connector including a sleeve for receiving the ferrule. The first fiber optic connector is mounted within a first threaded body with the fiber optic cable extending through an opening in a distal end of the first threaded body and the ferrule accessible through a proximal end of the first threaded body. The fiber optic adapter is mounted within a second threaded body and the second threaded body adapted for mounting to a bulkhead. The second threaded body adapted to engage the proximal end of the first threaded body with the first connector engaging the adapter and the ferrule extending into the sleeve. An outer housing is threadably mounted about both the first and second threaded bodies when the second threaded body is engaging the proximal end of the first threaded body. The first and second threaded bodies and the outer housing cooperate to hold the first connector engaging the adapter.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 4 is an end view of the side view of the fiber optic connection system of FIG. 1.

FIG. 5 is a cross-sectional side view of the fiber optic connection system of FIG. 1.

FIG. 6 is a perspective view of a cable end assembly of the fiber optic connection system of FIG. 1.

FIG. 7 is a side view of the cable end assembly of FIG. 6.

FIG. 8 is a cross-sectional side view of the cable end assembly of FIG. 6.

FIG. 9 is an exploded perspective view of the cable end assembly of FIG. 6.

FIG. 10 is a perspective view of the bulkhead assembly of the fiber optic connection system of FIG. 1.

FIG. 11 is a side view of the bulkhead assembly of FIG. 10.

FIG. 12 is a cross-sectional side view of the bulkhead assembly of FIG. 10.

FIG. 13 is a perspective view of a second embodiment of a ruggedized fiber optic connection system in accordance with the present invention.

FIG. 15 is an end view of an adapter body for use with the fiber optic connection system of FIG. 13.

FIG. 16 is a side cross-sectional view of the adapter body of FIG. 15.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

FIGS. 1 to 5 show a fiber optic connection system 10 for connecting a service drop cable 12 or other cable to a fiber optic telecommunications network. System 10 provides weather or harsh environment protection to a optical fiber connection housed within system 10. System 10 also provides a degree of resistance to tension from cable 12 which may be acting to pull a connector 22 from an adapter 18 within system 10.

Figure 3:
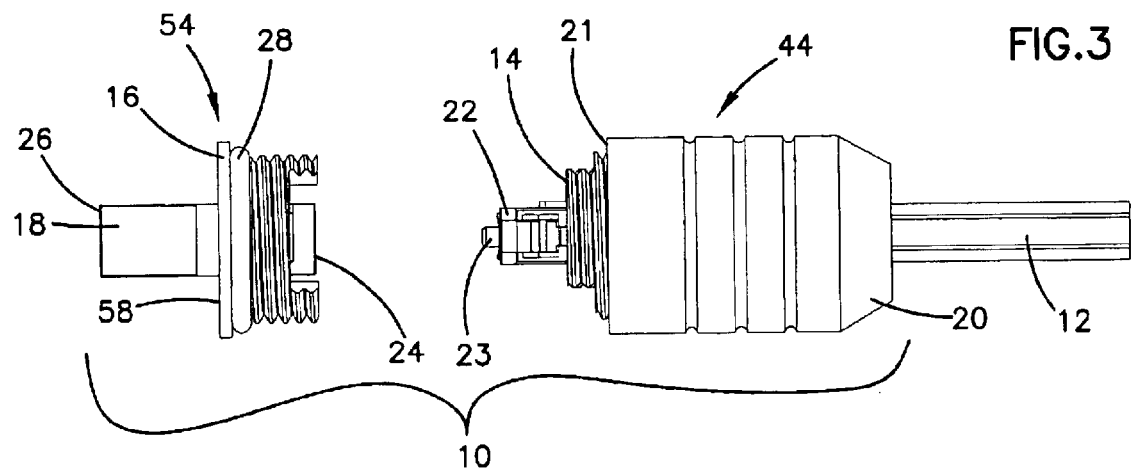
FIG. 3 is a side view of the fiber optic connection system of FIG. 2, with the first and second threaded bodies separated from each other.
Figure 2:
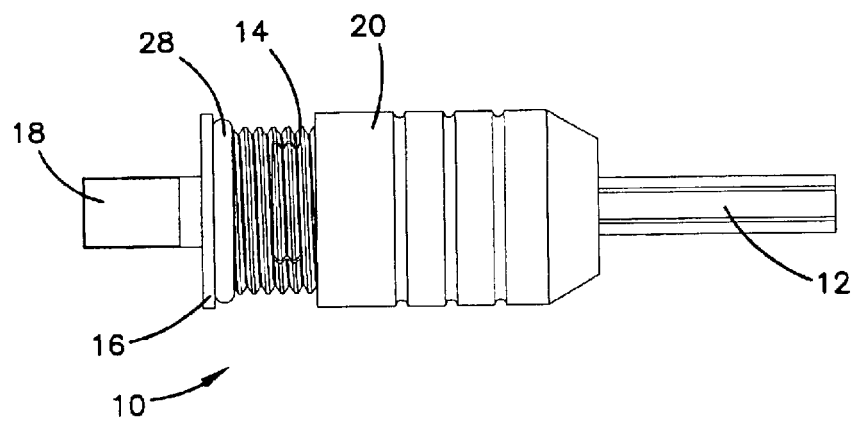
FIG. 2 is a side view of the fiber optic connection system of FIG. 1, with an outer housing partially unthreaded from about first and second threaded bodies.
Figure 1:
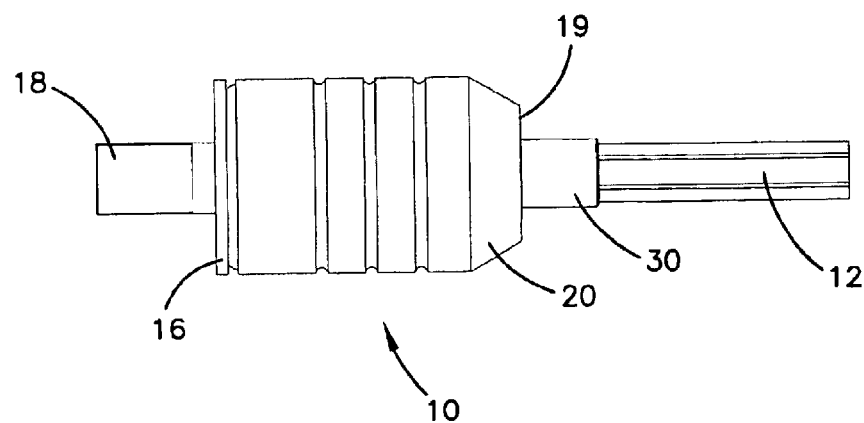
FIG. 1 is a side view of a fiber optic connection system according to the present invention.

Referring now to FIGS. 1 to 3, connector 22 is mounted within a cable end assembly 44 and adapter 18 is mounted to a bulkhead assembly 54. Also included in cable end assembly 44 are an outer housing 20 threaded received about a first threaded body 14. Cable end assembly 44 also includes a cable mount 30 to which cable 12 is physically connected and to which connector 22 is mounted. Cable mount 30 extends within first threaded body 14 and through outer housing 20.

Bulkhead assembly 56 includes adapter 18 having a first end 24 for receiving an optical fiber connector such as connector 22 and a second end 26. Second end 26 as shown in also configured to receive a fiber optic connector such as connector 22. While both ends 24 and 26 are shown configured to receive a standard SC connector, it is anticipated that other styles and formats of optical fiber connectors may be used with the present invention. It is also anticipated that first end 24 and second end 26 may receive different format or style optical fiber connectors. Bulkhead assembly 56 also includes a second threaded body 16 through which adapter 18 is mounted. Second threaded body 16 includes a rear face 58 which adapted to fit against an outer wall of a bulkhead with second end 26 and first end 24 of adapter 18 on opposite sides of the bulkhead. As system 10 is adapted to seal the connector 22 within first end 24 of adapter 18 against tension and adverse environmental effects, it is anticipated that first end 22 will be positioned on the side of the bulkhead most likely to be subjected to such conditions. Examples of such an installation include mounting bulkhead assembly 56 to an outer wall of a junction box housing mounted atop a utility pole.

First threaded body 14 and second threaded body 16 engage each other, as will be described further below, and form a continuous thread for outer housing 20 to threadably engage. A first end 21 of outer housing 20 engages an o-ring 28 mounted about first threaded body 16 opposite rear face 58. O-ring 28 forms a weather resistant seal between first end 21 of outer housing 20 and second threaded body 16. As will be described further below, a second o-ring 34 (shown in FIG. 5) about cable mount 30 is engaged by a second end of outer housing 20 to provide a weather resistant seal between outer housing 20 and first threaded body 14.

Connector 22 includes a ferrule 23 where an end of an optical fiber of cable 12 is terminated. Adapter 18 includes a sleeve 42 within a central opening 32 sized to receive ferrule 23 when connector 22 is received within first end 24 of adapter 18. Sleeve 42 also extends within second opening 26 to receive a ferrule of a fiber optic connector inserted within second end 26 of adapter 18. The ferrule of two connectors inserted within the two ends of adapter 18 aligned with each other within central opening 32 so that optical signals may be transferred between the cables terminated at each of the ferrules. Adapter 18 and connector 22 are described in further detail in U.S. Pat. No. 5,317,663, the disclosure of which is incorporated herein by reference. U.S. Pat. No. 5,317,663 describes an SC type connector and adapter.

FIGS. 4 and 5 show rear face 58 about adapter 18 of system 10. Central opening 32 is axially aligned with sleeve 42 and ferrule 23 is positioned within sleeve 42. O-ring 34 is positioned about cable mount 30. Cable mount 30 also includes a central shaft 40 about which outer housing 20 is rotatably positioned. A shoulder 62 defines the widest portion of cable mount 30 and is closely matched in size to an inner diameter of outer housing 20 while still allowing free movement and rotation of outer housing 20 about cable mount 30. A keyed feature 36 of first threaded body 14 engages a second interlocking keyed feature 38 of second threaded body 16. An optical fiber (not shown) extends within a central opening 13 of cable 12 and extends through cable mount 30 and connector 22 to terminate at ferrule 23. Additional openings 11 in cable 12 provide passage for strength members to extend. These strength members are physically attached to cable mount 30 when cable 12 is terminated at cable end assembly 44.

FIGS. 6 to 9 show first threaded body 12 of cable end assembly 44 including threads 52 on an outer wall and threads 50 on an inner wall of outer housing 20. Threads 50 and 52 mesh with each other. First threaded body 14 includes a central opening 48 sized to receive a outer shell 25 of connector 22 so that shell 25 is fixed rotationally and longitudinally with respect to first threaded body 14. Cable mount 30 includes a central opening 46 axially aligned with ferrule 23 of connector 22 so that the optical fiber from cable 12 may extend to ferrule 23. Connector 22 also includes an inner shell 27 to which ferrule 23 is mounted and which is in turn mounted within opening 46 of cable mount 30. Outer shell 25 also includes recesses 61 for receiving catches 60 of adapter 18 (described below with regard to FIG. 12). Keyed feature 36 of threaded body 14 is configured such that second threaded body 16 and adapter 18 may be engaged in only one rotational orientation.

FIGS. 10 to 12 show bulkhead assembly 54 included threads 56 formed about an outer surface of second threaded body 16. Threads 56 are compatible with threads 50 and 52. When first threaded body 14 and second threaded body 16 are aligned such that keyed features 36 and 38 are properly aligned and adapter 18 engages connector 22, threads 52 and 56 are aligned with each other so that threads 50 of outer housing 20 is able to be threaded over both the first and second threaded bodies. Catches 60 within first and second ends 24 and 26 of adapter 18 engage recesses 61 in outer shell 25 of connector 22. Adapter 18 includes a pair of clips 62 which extends from opposite sides of adapter 18 and releasably mounts adapter 18 within second threaded body 16. First end 24 of adapter 18 is inserted through an opening in rear face 58 until clips 62 extend as shown in FIG. 12. Clips 64 engage a front face 59 opposite rear face 58 and a pair of opposing shoulders 63 of adapter 18 engage rear face 58. Clips 64 and shoulders 63 cooperate to mount adapter 18 to second threaded body 16.

Figure 11A:
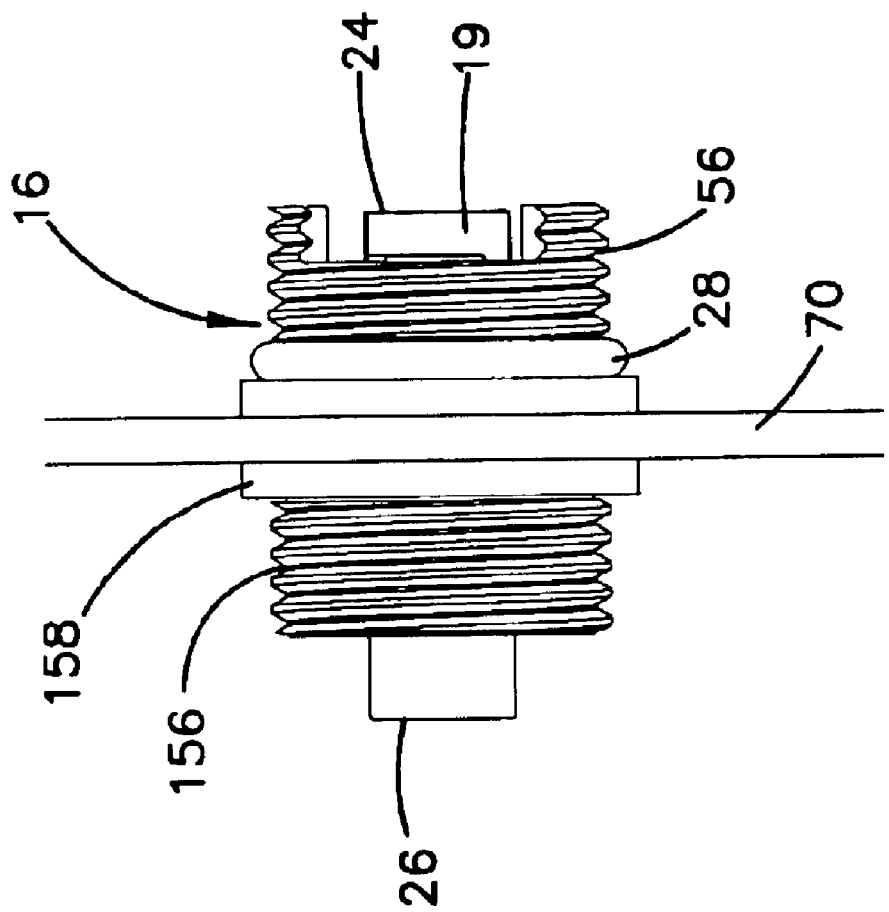
FIG. 11A is a side view of an alternative bulkhead assembly mounted to a bulkhead.

Referring now to FIG. 11A, an alternative embodiment second threaded portion 116 is shown mounted to a bulkhead 70. Rear face 58 is positioned againsty bulkhead 70 and second end 26 of adapter 18 extends through bulkhead 70 to a side opposite first end 24. Second threaded body 116 includes a second threaded portion 156 extending opposite threads 56 through bulkhead 70. A nut 158 is threaded onto second threaded portion 156 and cooperates with rear face 58 to mount second threaded body 116 to bulkhead 70. Other mounting methods are anticipated for mounting second threaded bodies 16 and 116 to bulkhead 70. A clip such as clip 64 may be mounted about the second end of adapter 18 and also cooperate with shoulders 63 to mount second threaded body 16 within an opening in bulkhead 70.

Referring now to FIGS. 13 to 16, a second embodiment 100 of a ruggedized fiber optic connection system. System 100 includes a cable end assembly 102, a bulkhead assembly 104 and an adapter body 106. Mounted within each bulkhead assembly 104 is a connector 22 in a female housing end 118. Mounted within each cable end assembly 102 is another connector 22 in a female housing end 120. Each of these connectors 22 includes a ferrule 23 within which an optical fiber is terminated. Adapter body 106 includes an adapter 18 mounted within and accessible through opposing male housing ends 114. When one of the male housing ends 114 is inserted within one of the female housing ends 118 or 120, the connector 22 within the female housing end is received within one of ends 24 and 26 of adapter 18.

Also, when one of the male housing ends 114 is inserted within one of the female housing ends 118 or 120, a latching mechanism 116 positioned about each of the male housing ends 114 engages mating surfaces (not shown) inside the female housing ends. Latching mechanism 116 and the mating surfaces within the female housing ends releasably and securely hold system 100 together to resist tension from cable 12.

Bulkhead assemblies 104 are mounted to a bulkhead 109 of a service drop housing 108. Within service drop housing 108, a fiber optic cable extends to each bulkhead assembly 104. These interior cables include optical fibers but may or may not include any strength members.

Figure 14:
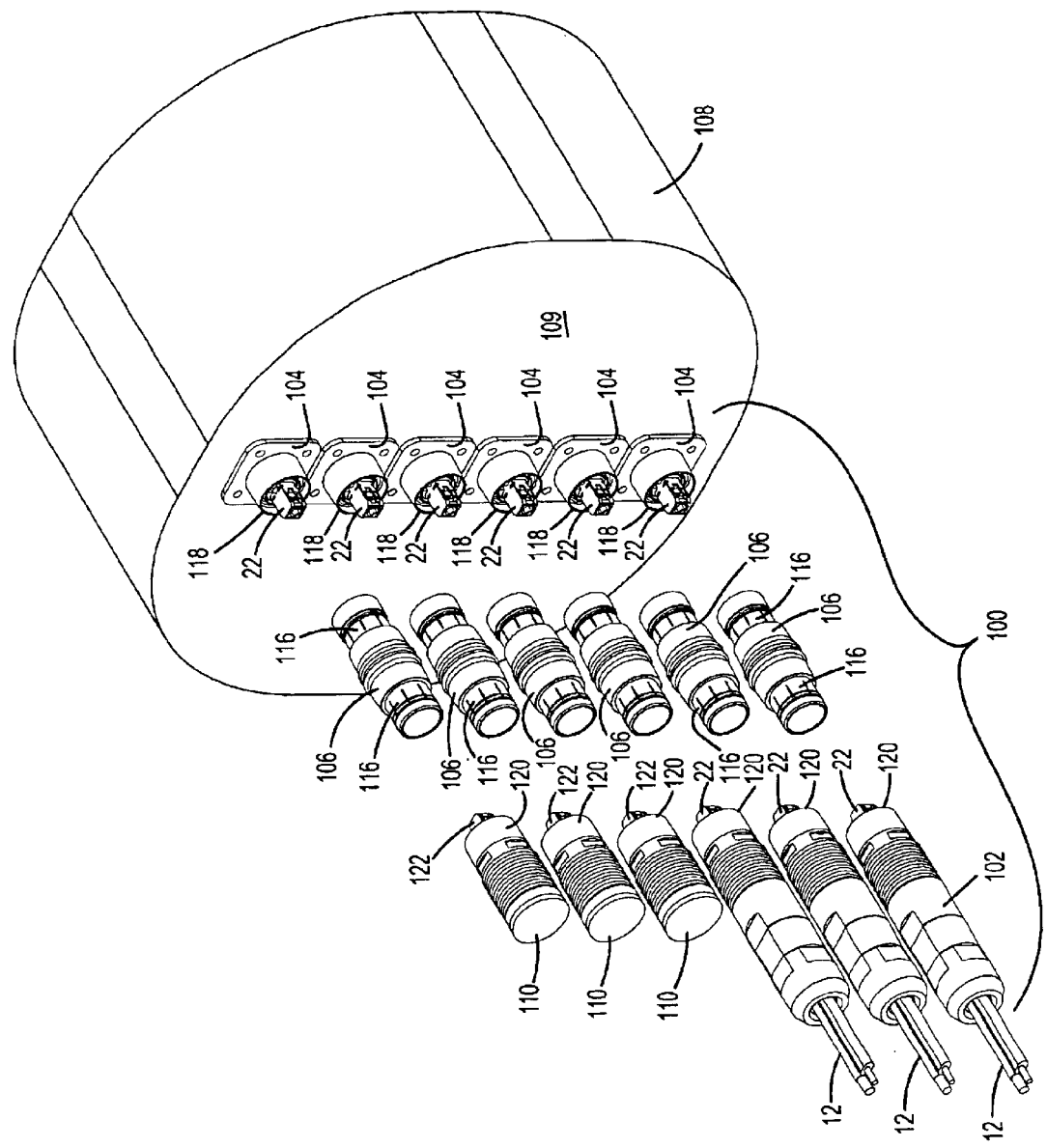
FIG. 14 is an exploded perspective view of the fiber optic connection system of FIG. 13.

Referring to FIGS. 13 and 14, the three topmost bulkhead assemblies 104 have adapter bodies 106 inserted within openings 118. On the opposite end of these adapter bodies 106, a plug assembly 110 is inserted into each of the openings 114. Plug assembly 110 includes the same external surfaces and shape of cable end assembly 102 and includes a connector 122. Connector 122 is identical to connector 22 except that no fiber is terminated within ferrule 23. Plug assembly 110 is adapted to seal opening 118 from adverse weather in the same way that cable end assembly 102 and acts as a placeholder to permit surplus bulkhead assemblies to be placed on housing 108 in anticipation of future expansion of service. Referring now to FIG. 16, note that an end cap 112 is positioned about each of the ends 114 to prevent entry of foreign matter or contaminants within adapter 18.

One of the features of system 100 is that access is provided to the end face of each ferrule holding an optical fiber during installation system 100. For example, to activate a new service drop, assuming that a bulkhead assembly 104 was available for use, a field technician might remove plug assembly 110 from adapter housing 106 and adapter housing 106 from bulkhead assembly 104. The technician could then inspect, and if necessary clean the end face of ferrule 23 of connector 22 within bulkhead assembly 104. Adapter body 106 might then be replaced with end 114 recevied within end 118 and ferrule 23 of connector 22 of bulkhead assembly 104 inserted within sleeve 42. The new service drop cable 12 with a cable end assembly 102 might then be cleaned and inspected for contaminates on ferrule 23. If the drop cable is suitable, end 120 might be inserted within the opposite end 114 of adapter body 106 with ferrule 23 received within sleeve 42. The two ferrules 23 within sleeve 42 are brought into alignment with each other to permit the passage of optical signals from one optical fiber to the other.

Figure 17:
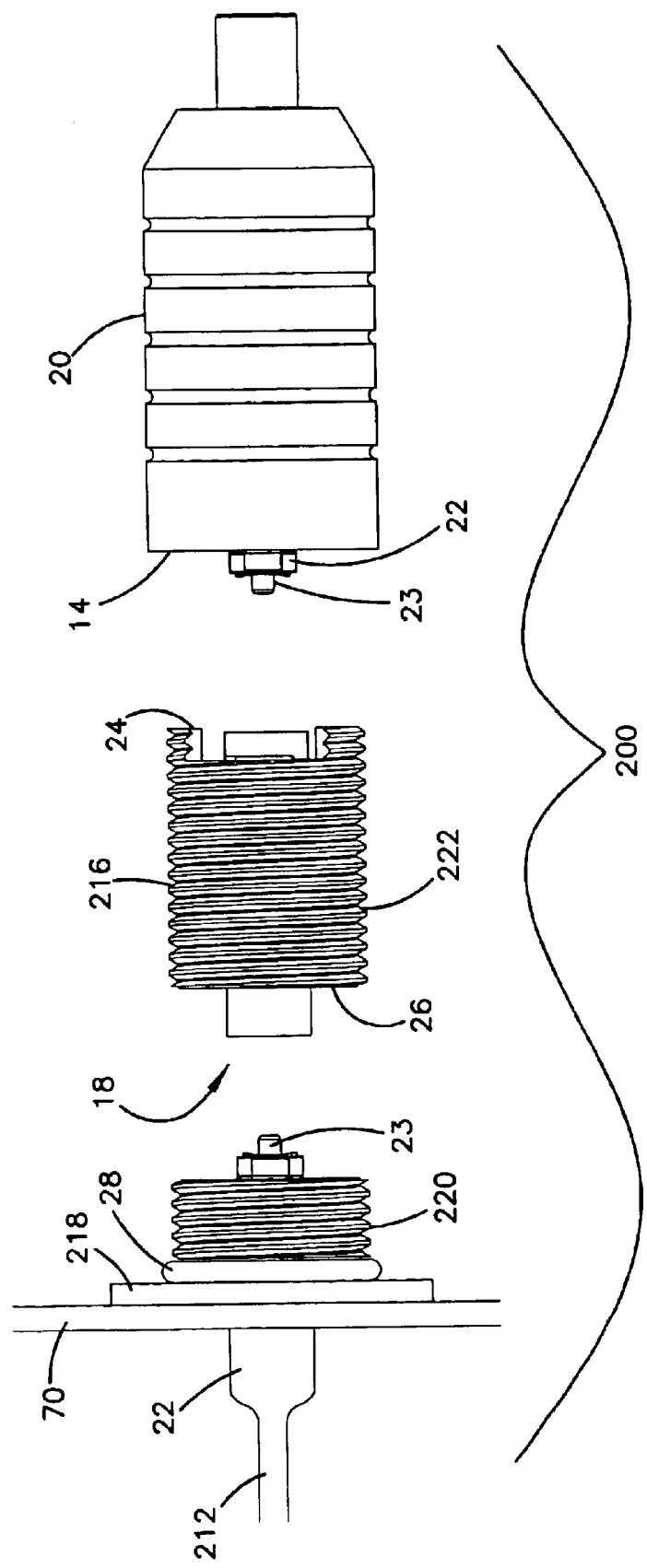
FIG. 17 is side view of a third embodiment of a ruggedized fiber optic cable connection system incorporating features of the first and second embodiments.

It is anticipated that system 100 might be adapted for use with the threaded bodies of system 10. Such a third embodiment system 200 is shown in FIG. 17. System 200 includes first threaded body 14 with a connector 22 attached to cable 12 with outer housing 20 threadably mounted. A second threaded body 216 includes adapter 18 as with the other second threaded bodies described above but is not adapted for mounted to a bulkhead. Second threaded body 216 is threaded end to end with threads 222 for threadably receiving outer housing 20 with ferrule 23 of connector 22 inserted within first end 24. A third threaded body 218 is mounted to bulkhead 70 and inculdes an adapter 22 mounted to a optical fiber cable 212 and having an optical fiber of cable 212 terminated at a ferrule 23. Third threaded body 218 includes threads 220 for threadably receiving outer housing 20 when ferrule 23 of connector 22 is inserted within second end 26 of adapter 18.

The above specification, examples and data provide a complete description of the manufacture and use of the invention. Since many embodiments of the invention can be made without departing from the spirit and scope of the invention, the invention resides in the claims hereinafter appended.

What is claimed is as follows:

1. A fiber optic cable connection system comprising:
    a first fiber optic connector with a first end and a second end, the second end mounted to an end of a fiber optic cable, and the first end including a ferrule within which an optical fiber of the fiber optic cable is mounted;
    a fiber optic adapter including a first end for receiving the first fiber optic connector, the first end including a sleeve for receiving the ferrule and aligning the optical fiber within the ferrule with a longitudinal axis of the sleeve;
    the first fiber optic connector mounted within a first threaded body with the fiber optic cable extending through an opening in a distal end of the first threaded body and the ferrule accessible through a proximal end of the first threaded body;
    the fiber optic adapter mounted within a second threaded body and the second threaded body adapted for mounting to a bulkhead;
    the second threaded body adapted to engage the proximal end of the first threaded body with the first end of the first connector engaging the first end of the adapter and the ferrule of the connector extending into the sleeve of the adapter;
    an outer housing threadably mounted about both the first and second threaded bodies when the second threaded body is engaging the proximal end of the first threaded body; and
    the first and second threaded bodies and the outer housing cooperating to hold the first end of the first connector engaging the first end of the adapter.

2. The fiber optic cable connection system of claim 1, wherein the first fiber optic connector is a standardized fiber optic connector and the first end of the adapter is adapted to receive the standardized fiber optic connector.

3. The fiber optic cable connection system of claim 2, wherein the first connector is an SC connector and the first end of the adapter is adapted to receive the SC connector.

4. The fiber optic cable connection system of claim 1, wherein the fiber optic adapter further includes a second end for receiving a second fiber optic connector with a ferrule, the second end including a sleeve for receiving the ferrule of the second connector and aligning an optical fiber within the ferrule of the second connector with the optical fiber within the ferrule of the first connector.

5. The fiber optic cable connection system of claim 4, wherein the second fiber optic connector is a standardized fiber optic connector and the second end of the adapter is adapted to receive the standardized fiber optic connector.

6. The fiber optic cable connection system of claim 5, wherein the second connector is an SC connector and the second end of the adapter is adapted to receive the SC connector.

7. The fiber optic cable connection system of claim 1, wherein a first o-ring is positioned about the fiber optic cable adjacent the distal end of the first threaded body, a second o-ring is positioned about the second threaded body, and the outer housing engages both o-rings to environmentally seal the first ends of the first connector and the adapter.

8. The fiber optic cable connection system of claim 1, wherein the second threaded body is fixedly mounted to a bulkhead and the threaded bodies and the outer housing cooperate to transfer tension from the cable to the bulkhead without disengaging the first end of the first connector from the first end of the adapter.

\* \* \* \* \*